Figure 1:
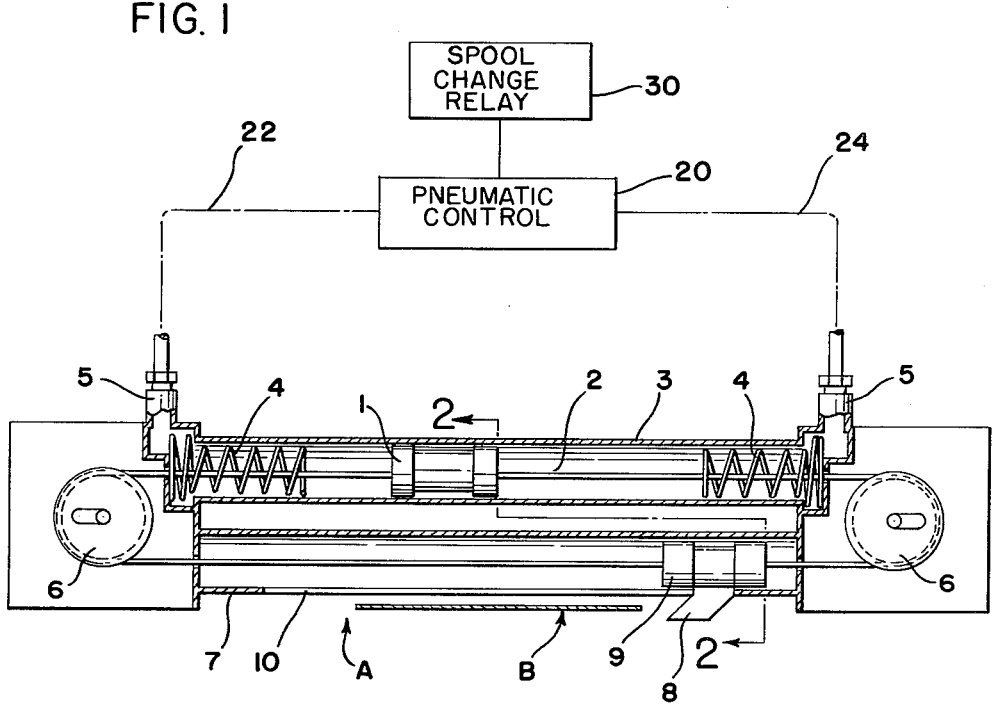

Oct. 26, 1965    HORST-GUENTER KEFERSTEIN ETAL   3,213,735
APPARATUS FOR CUTTING A MOVING SHEET
Filed April 8, 1963

INVENTORS.
HORST-GÜNTER KEFERSTEIN
& WALTER HUSSAR
BY
Tilbury & Body
ATTORNEYS

United States Patent Office 3,213,735
Patented Oct. 26, 1965

3,213,735
APPARATUS FOR CUTTING A MOVING SHEET
Horst-Guenter Keferstein, Muellekoven, and Walter Hussar, Siegburg, Germany, assignors to Reifenhaeuser Kommanditgesellschaft, Troisdorf, Cologne, Germany
Filed Apr. 8, 1963, Ser. No. 271,422
Claims priority, application Germany, May 15, 1962, R 32,701
2 Claims. (Cl. 83—353)

The present invention pertains to the art of cutting and more particularly to an apparatus for cutting a moving sheet.

This invention is particularly applicable to cutting a sheet of thin plastic foil as it is moving rapidly through a processing line and the invention will be discussed with particular reference thereto; however, it is to be appreciated that the invention has much broader applications and may be used for cutting a sheet of various materials irrespective of the velocity at which the sheet is moving.

In manufacturing thin plastic foil, the foil is removed from the end of the processing line by being rolled onto a spool. After one spool is filled, the moving foil is cut and fed onto a waiting empty spool. To prevent interruption of the continuously moving foil, the cut made in the foil after a given spool is filled must be made very rapidly.

Cutting apparatus has been proposed for shearing the moving foil in a transverse direction after a spool has been filled so that the cut end of the foil can be directed toward the empty spool. Often the moving foil has a substantial width; therefore, such shearing apparatus required long, rigidly secured coacting blades that were quite heavy. Consequently, the high acceleration necessary for making the rapid cut across the moving foil created considerable inertia forces which necessitated sturdy and expensive construction of the shearing apparatus before they would stand up under such forces. In addition, the shearing blades of such apparatus required frequent resharpening and adjusting. If this were not done, the thin plastic foil was pulled between the blades and the cut across the foil was not continuous. For these reasons, the shearing apparatus heretofore proposed were not satisfactory.

To alleviate the problems posed by the excessive weight and cutting deficiencies of the shearing apparatus, a comparatively simple lightweight cutting device was developed which device operated on the principle of contacting the moving foil with an electrically heated wire. The heated wire would melt the moving foil at the point of contact between the wire and the foil. Such a device proved satisfactory for plastic foils having longitudinal velocities below sixty meters per minute; however, when the foil was traveling at velocities substantially greater than sixty meters per minute, the heated wire did not have sufficient time to melt through the moving foil. Accordingly, these devices did not prove to be satisfactory in operation over the complete spectrum of velocities required for such a cutting device. Another deficiency of the heated wire cutting devices is that such devices could not be used to efficiently cut any material except thermoplastic materials.

To overcome the difficulties encountered by the shearing apparatus and the hot wire cutting devices, it was proposed to use serrated knives that cut against a mandrel. Such an arrangement was successful as speeds substantially over sixty meters per mnuite; however, at the lower speeds, the serrated knife could not cut the foil.

These and other disadvantages are completely eliminated by the present invention which is directed toward a cutting apparatus that can efficiently sever a moving strip irrespective of its material and its longitudinal velocity.

In accordance with the present invention, there is provided an apparatus for cutting a longitudinally moving sheet or strip which apparatus comprises guide means extending generally transversely across the sheet, a cutter with a cutting edge generally perpendicular to the sheet, with the cutter moveably received within the previously mentioned guide means, and power means for moving the cutter along the guide means and across the sheet at a velocity substantially greater than the velocity of the sheet.

The primary object of the present invention is the provision of an apparatus for cutting a longitudinally moving sheet which apparatus is durable in operation, inexpensive to manufacture and easy to install.

Another object of the present invention is the provision of an apparatus for cutting a longitudinally moving sheet which apparatus can cut thin sheets of various materials moving at a wide range of longitudinal velocities.

Another object of the present invention is the provision of a cutting apparatus, as defined above, which does not depend on the fusibility of the material being cut.

A further object of the present invention is the provision of an apparatus, as defined above, which does not depend on shearing action to cut the strip material.

Yet another object of the present invention is the provision of an apparatus for cutting a longitudinally moving sheet which apparatus includes a cutter having a cutting edge generally perpendicular to the sheet and means for moving the cutter transversely across the sheet from one side to the other at a velocity greatly exceeding the velocity of the sheet.

Yet another object of the present invention is the provision of an apparatus for cutting a longitudinally moving sheet comprising guide means extending generally transversely across the sheet, a cutter with a cutting edge generally perpendicular to the sheet and means for moving the cutter transversely across the sheet along the guide means at a velocity substantially greater than the velocity of the sheet.

Figure 2:
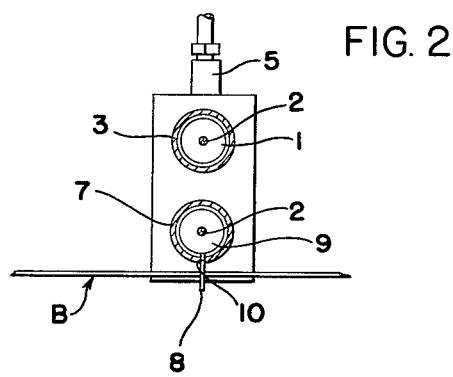

These and other objects and advantages will become apparent from the following description used to illustrate the preferred embodiment of the invention as read in connection with the accompanying drawings in which:

FIGURE 1 is a front, somewhat schematic, elevational view illustrating the preferred embodiment of the present invention; and FIGURE 2 is a somewhat schematic, cross-sectional view taken generally along the line 2—2 of FIGURE 1.

Referring now to the drawings, wherein the showings are for the purpose of illustrating a preferred embodiment of the invention only and not for the purpose of limiting same, FIGURES 1 and 2 show an apparatus A for cutting a moving sheet or foil B especially such an apparatus which cuts a thin plastic foil after a take-up spool has been filled and prior to directing the foil to an empty spool. A variety of structural embodiments could be incorporated for accomplishing the present invention; however, in accordance with the preferred embodiment of the present invention as shown, the apparatus A comprises a piston 1 connected at both ends onto an actuating cable 2 and reciprocally mounted within a cylinder 3 extending above the foil B. At either end of cylinder 3 there is provided a shock absorbing device which, in accordance with the illustrated embodiment of the present invention is shown as a coil spring 4. Piston 1 is shifted back and forth within cylinder 3 by air pressure directed against the cylinder through the spaced control passages 5.

As so far described, piston 1 reciprocates back and forth within cylinder 3 to move the ends of cable 2 within the cylinder 3 in accordance with the pressure introduced into the cylinder.

Cable 2, in accordance with the illustrated embodiment of the present invention, is entrained around spaced sheaves 6 and extends through a guide tube 7 wherein it is connected onto a guide block 9 having a downwardly extending cutter 8 protruding through slot 10 of the tube 7. The cutter 8 moves across the moving sheet B in the direction of the arrow adjacent the cutter and has a cutting edge facing toward sheet B which edge is substantially perpendicular to the sheet or foil.

As piston 1 is forced to the right in cylinder 3, the cutter 8 cuts the sheet B by being shifted transversely across the moving sheet. Although the cable 2 is shown as being entrained around sheaves 6, it is within the contemplation of the present invention to provide means in the position of sheaves 6 for increasing the velocity of the portion of cable within guide tube 7. Various arrangements such as mechanical velocity multiplying devices could be suggested; however, the particular device for increasing the velocity of the cable is not limited to any particular arrangement.

To control the operation of piston 1 in cylinder 3, there is provided a schematically represented pneumatic control 20 having control lines 22, 24 directed to the spaced passages 5. By proper adjustment of the pneumatic control 20, the desired amount of fluid, such as compressed air, can be directed into the cylinder 3 on either end of piston 1. Further, it is within the contemplation of the invention to provide a trigger device, such as a spool change relay 30, which device is actuated as one spool is filled by sheet B and when it is desired to shift the sheet B toward a second empty spool. Accordingly, the relay 30 is energized when the sheet B should be cut and energization of the relay actuates pneumatic control 20 to direct pressurized fluid into the cylinder 3 at the left end of piston 1. This shifts the piston to the left and causes transverse movement of cutter 8 over sheet B. To increase the speed of the cutter 8, the fluid control 20 may be adjusted or the speed ratio of the sheaves 6 may be changed as previously described. Cutter 8 is retracted by introducing fluid into the right end of cylinder 3. It is within the contemplation of the invention to provide various propelling systems for the transverse movement of cutter 8.

In accordance with the invention, the cutter 8 moves across the sheet B at a rate greatly exceeding the longitudinal velocity of the sheet. This indicates that the cutter 8 is moving across the sheet at such a rapid rate that the longitudinal movement of the sheet does not entangle or hamper the cutting operation of cutter 8. The relative velocities between the cutter 8 and sheet B is so correlated that the sheet B moves only a short distance in a longitudinal direction during the complete transverse movement of cutter 8. The particular speed ratio can be devised after appreciation that the speed of the cutter must be sufficiently greater than the speed of the moving sheet.

It is within the intended scope of the present invention to position guide tube 7 at a transverse angle with respect to the moving sheet B so that the cut made by cutter 8 will be substantially perpendicular to the sides of the sheet B irrespective of the speed of the cutter as it cuts through the sheet. As the relative speed of the cutter with respect to the sheet is changed, the angle of guide tube 7 may be changed accordingly if a perpendicular cut is essential.

The present invention has been discussed in connection with a given structural embodiment; however, it is to be appreciated that various structural changes may be made without departing from the intended spirit and scope of the present invention as defined by the appended claims.

Having thus described our invention, we claim:

1. An apparatus for cutting a longitudinally moving sheet of thin material, said apparatus comprising a tube extending generally transversely across said sheet and spaced therefrom, a slot in said tube and facing said sheet, said slot coextensive with said tube and having a length greater than the width of said sheet, a cutter having a body slidably received within said tube and a cutting edge protruding through said slot and positioned generally perpendicular to said sheet, a fluid cylinder parallel to said tube and extending along one side thereof, a piston reciprocally received within said cylinder, a first sheave between said tube and cylinder at one end thereof, a second sheave between said tube and cylinder at the other end thereof, a cable-like element extending around each of said sheaves and connecting said body in said tube onto said piston in said cylinder, a source of pressurized fluid, a first and second conduit for connecting said source to said cylinder at first and second sides of said piston, a first valve in said first conduit for selectively opening said first conduit for actuation of said piston and cutter in unison in a first direction to move said cutting edge across said sheet at a velocity greatly exceeding the velocity of said moving sheet and a second valve in said second conduit for selectively opening said second conduit for actuation of said piston and cutter in unison in a second direction to move said cutting edge in a direction opposite to said first-mentioned cutting direction of said edge.

2. An apparatus as defined in claim 1 including spring means in said cylinder for stopping the movement of said piston after said sheet is cut by said cutting edge.

References Cited by the Examiner

UNITED STATES PATENTS

| 1,447,091 | 2/23 | Lansing | 83—614 X |
|---|---|---|---|
| 1,555,391 | 9/25 | Surfus | 83—614 X |
| 1,866,799 | 7/32 | Clark | 83—487 X |
| 1,920,591 | 8/33 | Pesci | 83—578 X |
| 2,159,282 | 5/39 | Marino | 83—353 X |
| 2,262,101 | 11/41 | Harris | 242—56 X |
| 2,265,498 | 12/41 | Stancliff et al. | 83—614 X |
| 2,483,429 | 10/49 | Pierce | 267—34 X |
| 2,682,379 | 6/54 | Piper et al. | 242—56 |
| 2,936,664 | 5/60 | Myers | 83—639 X |
| 3,054,624 | 9/62 | Nallinger | 267—34 X |

FOREIGN PATENTS

| 223,104 | 1/62 | Austria. |
|---|---|---|
| 266,907 | 11/13 | Germany. |

ANDREW R. JUHASZ, *Primary Examiner.*

JORDAN FRANKLIN, *Examiner.*